(12) United States Patent
Meegan, Jr.

(10) Patent No.: US 6,749,666 B2
(45) Date of Patent: Jun. 15, 2004

(54) MODULATED ACOUSTIC AGGIOMERATION SYSTEM AND METHOD

(75) Inventor: George Douglas Meegan, Jr., Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 10/133,825

(22) Filed: Apr. 26, 2002

(65) Prior Publication Data

US 2003/0200864 A1 Oct. 30, 2003

(51) Int. Cl.[7] .......................... B01D 21/28; B01D 51/08
(52) U.S. Cl. ................... 95/29; 55/318; 55/DIG. 29; 96/389
(58) Field of Search .................. 55/315, 318, DIG. 25; 95/29, 30, 175, 389

(56) References Cited

U.S. PATENT DOCUMENTS

| | | |
|---|---|---|
| 2,448,372 A | 8/1948 | Horsley |
| 2,535,679 A | 12/1950 | Horsley et al. |
| 2,535,700 A | 12/1950 | Seavey et al. |
| 2,609,063 A | 9/1952 | Francis |
| 2,646,133 A | 7/1953 | Schutt |
| 3,026,966 A | 3/1962 | Asklof |
| 3,389,971 A | 6/1968 | Alliger |
| 3,681,009 A | 8/1972 | Horsley |
| 4,307,964 A | 12/1981 | Dudgeon et al. |
| 4,313,920 A | 2/1982 | Cooper |
| 4,319,891 A | 3/1982 | Anderson et al. |
| 4,378,976 A | 4/1983 | Rush |
| 4,475,921 A | 10/1984 | Barmatz |
| 4,770,675 A | 9/1988 | Kurzweg et al. |
| 4,948,497 A | 8/1990 | Ohkawa |
| 5,085,673 A | 2/1992 | Bentley et al. |
| 5,085,783 A | 2/1992 | Feke et al. |
| 5,147,562 A | 9/1992 | Heyman |
| 5,164,094 A | * 11/1992 | Stuckart ..................... 210/708 |
| 5,183,481 A | 2/1993 | Felder |
| 5,197,399 A | 3/1993 | Mansour |
| 5,353,721 A | 10/1994 | Mansour et al. |
| 5,419,877 A | 5/1995 | Goforth et al. |
| 5,769,913 A | 6/1998 | Gallego Juarez et al. |
| 5,827,350 A | 10/1998 | Magill et al. |

OTHER PUBLICATIONS

D. S. Scott, "*A New Approach to the Acoustic Conditioning of Industrial Aerosol Emissions*" (Journal of Sound and Vibration) 1975, 43(4), pp. 607–619.

J. A. Gallego et al., "*A Pilot Scale Acoustic System For Fine Particle Removal From Coal Combustion Fumes*" (1995 World Congress on Ultrasonics), pp. 737–740, Madrid, Spain.

Karl Matthew Martin, B.S., "*Acoustic Filtration in a Closed System*" (Thesis), Dec. 1997, 91 pgs., The University of Texas at Austin.

Chris Everett Peterson, B.S., Thesis: "Experimental Studies in Acoustic Agglomeration: Dependence on Frequency and SPL," Aug. 2000, 103 pgs.

\* cited by examiner

*Primary Examiner*—Robert A. Hopkins
(74) *Attorney, Agent, or Firm*—Hunton & Williams LLP (57) ABSTRACT

An acoustic agglomerator for agglomerating constituents in a fluid is provided. The acoustic agglomerator includes an area containing a fluid having constituents and an acoustic generator operable to generate a modulated acoustic field to enhance agglomeration of the constituents in the fluid. In one aspect the acoustic field is frequency modulated and in other aspects the acoustic field is amplitude modulated, while yet in other aspects the acoustic field is both frequency and amplitude modulated. A method for agglomerating constituents in a fluid is also provided. The method includes providing a fluid with a constituent and applying an acoustic field to the fluid. The method provides for modulating the acoustic field to cause the constituent to agglomerate.

92 Claims, 3 Drawing Sheets

| NO SOUND | —— |
| SINUSOID | ---- |
| MODULATION | — — |

FIG. 3

| NO SOUND | —— |
| SINUSOID | ---- |
| MODULATION | — — |

MODULATED ACOUSTIC AGGLOMERATION SYSTEM AND METHOD

CROSS-REFERENCE TO RELATED APPLICATIONS

Not Applicable.

FEDERALLY SPONSORED RESEARCH AND DEVELOPMENT

Not Applicable.

TECHNICAL FIELD OF THE INVENTION

The present invention relates generally to the field of acoustic agglomeration, and more particularly, but not by way of limitation, to a modulated acoustic agglomeration system and method for removing constituents in a fluid stream.

BACKGROUND OF THE INVENTION

Fluid streams comprising small constituents are produced by many chemical and combustion processes, such as, but not limited to, particulates in the exhaust gas stream of coal fired power plants. Such particulate matter is undesirable and should be removed before the gas stream is passed to equipment or processes and released into the atmosphere. It is particularly challenging to remove such particulate matter from high temperature gas streams in large volumes exhausted from boilers of such power generating facilities.

Particles which are over ten microns in diameter are frequently removed from gas streams by conventional porous filters, such as bag houses and the like, but smaller particles are much more difficult to remove because the porosity of the filter must be so small to capture these fine particles that it creates a substantial pressure drop across the filter. The pressure drop is problematic, consumes energy resources and may inhibit the combustion process. Therefore, porous filters cannot remove small particles from gas streams efficiently.

From time to time, particulates in a gas stream collide with one another and may naturally agglomerate with other such particles on impact to form larger agglomerate particles. This agglomeration is beneficial because the agglomerated particles are larger and thus susceptible to filtration from the porous filters. However, such incidences of natural agglomeration are limited. Increasing the incidence of collisions and agglomeration results in a reduced emission of such particulates into the atmosphere. For this reason, many methods of agglomerating these particles have been employed. The number of collisions may be increased by confining the gas stream in a tube, flue, or duct and subjecting the particles to a sonic or acoustic field. This process is referred to as acoustic agglomeration and has been employed to agglomerate small particles into larger agglomerates.

However, methods of acoustic agglomeration are frequently inefficient in that the power consumption required by such devices negates the benefits achieved by only marginal reduction in the particulates exhausted into the atmosphere. Methods of acoustically agglomerating particulates employing a sound source emitting a fixed or constant frequency or employing a pulse combustor producing a saw-tooth wave have been employed.

Such systems, however, suffer from deficiencies including lacking sufficient control of the particulate agglomeration, failing to agglomerate particulates of a small size, and inefficiency in agglomeration and power consumption when compared to the actual reduction in particulate emission. Additionally, small particulates, such as those below ten microns, continue to be difficult to successfully agglomerate into particulates of sufficient size for treatment by filter processes by generally accepted methods of employing acoustic agglomeration.

Thus, a need exists for an improved system and method for acoustically agglomerating constituents in a fluid stream. Furthermore, a need exists for a more efficient system and method for acoustically agglomerating particulates in the fluid stream capable of achieving consistent and controlled constituent agglomeration. It is to such an acoustic agglomeration system and method that the present invention is directed.

SUMMARY OF THE INVENTION

In one aspect, the present invention is directed to a method for agglomerating constituents in a fluid. The method broadly includes providing a fluid with a constituent and applying an acoustic field to the fluid. The method further includes modulating the acoustic field to cause the constituent to agglomerate.

In one aspect of the present invention, the acoustic field is amplitude modulable, in another aspect the acoustic field is frequency modulable, while yet in other aspects the acoustic field is both frequency and amplitude modulable.

One advantage of the present invention is that frequency, amplitude and/or a combination of frequency and amplitude modulation of the acoustic field applied to a fluid containing constituents significantly improves agglomeration of the constituents. In one aspect, the frequency of the acoustic field is modulable in a range of up to 1 GHz and the amplitude of the acoustic field is modulable in a range of up to 200 dB referenced to 20 micro-Pascals.

In other aspects, the frequency of the acoustic field is modulable in a range of up to 20 kHz and the amplitude of the acoustic field is modulable in a range of up to 200 dB referenced to 20 micro-Pascals. While in other aspects, the frequency of the acoustic field is modulable in a range of from about 50 Hz to about 15 kHz and the amplitude of the acoustic field is modulable in a range of from about 130 dB to about 175 dB referenced to 20 micro-Pascals.

In one aspect, the fluid is a liquid. In other aspects, the fluid is defined as a gas or may be a combustion exhaust gas, while in yet other aspects the constituent of the combustion gas is fly ash.

In one aspect, the method includes applying a plurality of acoustic fields to the fluid. In another aspect, each of the plurality of acoustic fields are provided with the same frequency, amplitude and/or combination of frequency and amplitude modulation. While in other aspects, the plurality of acoustic fields are provided at a different frequency, amplitude and/or combination of frequency and amplitude modulation. While still in other aspects, some of the plurality of acoustic fields are provided at the same frequency, amplitude and/or combination of frequency and amplitude modulation and others of the plurality of acoustic fields are provided at a different frequency, amplitude and/or combination of frequency and amplitude modulation.

In one aspect the acoustic field has an initial frequency and the acoustic field is frequency modulated relative to the initial frequency to cause the constituent to agglomerate. In another aspect, the acoustic field is modulated to a first frequency substantially less than the initial frequency, while in other aspects the acoustic field is modulated to a first frequency substantially greater than the initial frequency. In one aspect, the acoustic field may be modulated to a second frequency substantially greater than the first frequency, while in other aspects, the acoustic field is modulated to a second frequency substantially greater than the initial frequency. In yet other aspects, the acoustic field may be modulated to a second frequency substantially less than the first frequency, while in other aspects the acoustic field is modulated to a second frequency substantially less than the initial frequency.

In one aspect, a method for agglomerating constituents in a fluid stream is provided that includes providing the fluid stream containing a constituent into a fluid passageway adapted to communicate the fluid stream. The method provides for applying an acoustic field to the fluid stream in the fluid passageway and modulating the acoustic field in the fluid passageway to cause the constituent to agglomerate in the fluid stream.

In yet another aspect, an acoustic agglomerator for agglomerating constituents in a fluid is provided. The acoustic agglomerator includes an acoustic plate, a shaft and a mechanical oscillator. The acoustic plate is configured for acoustic generation. The shaft has a first end and a second end, the first end of the shaft connected to the acoustic plate. The mechanical oscillator is connected to the second end of the shaft for imparting an oscillation thereon the shaft and the acoustic plate connected thereto for generating a modulated acoustic field.

In one aspect, an acoustic agglomerator for agglomerating constituents in a fluid stream is provided. The acoustic agglomerator includes a duct, a manifold system and at least a first sound source. The duct has a sidewall defining a fluid passageway, the duct is adapted to receive the fluid stream having the constituents. The manifold system is coupled to the duct such that the manifold system communicates with the fluid passageway. The at least a first sound source is coupled to the manifold system and is operable to generate a modulated acoustic field within the fluid passageway of the duct.

In yet another aspect, an acoustic agglomerator for removing particulates from a fluid stream is provided. The acoustic agglomerator includes a duct, an acoustic generator and a particle collection device. The duct has a sidewall defining a passageway, the duct is operable to receive the fluid stream having particulates. The acoustic generator is adapted to generate a modulated acoustic field in the fluid passageway of the duct. The particle collection device communicates with the duct to receive the fluid stream therefrom the duct. The particle collection device adapted to remove at least a portion of the particulate from the fluid stream.

In one aspect, the acoustic agglomerator further includes a plurality of acoustic generators each capable of generating a modulated acoustic field in the fluid passageway of the duct.

Other objects, features, and advantages of the present invention will be apparent to those skilled in the art from the following detailed description when read in conjunction with the accompanying drawings and appended claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein.

Figure 1:
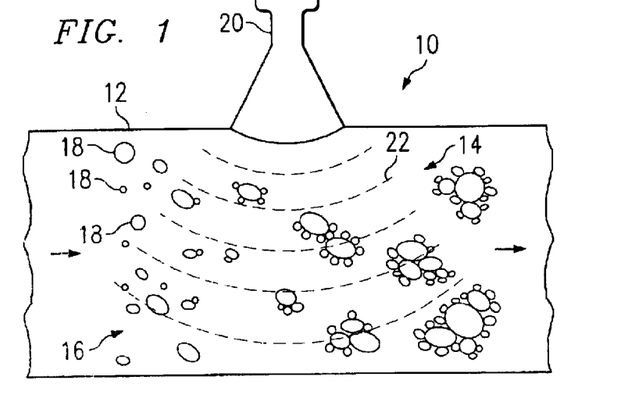
FIG. 1 is a side view of one aspect of the present invention of an acoustic agglomerator illustrating a passageway of a duct containing a fluid stream.

FIG. 1 illustrates one aspect of the present invention of an acoustic agglomerator 10 for agglomerating constituents in a fluid. The acoustic agglomerator 10, according to one aspect, includes a duct 12 defining a passageway 14. The duct 12 is adapted to receive a fluid stream 16 containing constituents 18 of varying sizes.

The acoustic agglomerator 10 further includes an acoustic generator 20 that is adapted to generate a modulated acoustic field 22 in the passageway 14 of the duct 12. The acoustic field 22 is modulated to enhance agglomeration of the constituents 18 in the fluid stream 16.

The duct 12, according to one aspect, may be an exhaust duct commonly used to transport combustion gas exhaust from the boilers of power generation facilities. Such power generation facilities may burn coal, lignite, or other material to produce electricity, for example. In this aspect, the fluid stream 16 may be the combustion exhaust gas from the boiler of the power generation facility flowing through the duct 12 and the constituents 18 may be particles of lignite fly ash, such as when lignite is the combustion fuel. As previously discussed, it is necessary for environmental and other reasons to reduce the amount of such particles in the gas exhaust, such as the fluid stream 16. By acoustically agglomerating the exhaust gas, the constituents 18, such as the lignite fly ash, may be more effectively and efficiently captured than using conventional techniques.

Conventionally power generation facilities utilize devices such as electrostatic precipitators (ESP) bag houses, cyclone separators, gravitational settling chambers and other particulate removal devices that are well known in the art. The conventional filtration devices are only effective when the size of the particulates, such as the constituents 18, are of sufficient size, such as 10 microns or larger, as previously discussed.

One significant advantage presented by the present invention is that modulating the acoustic field 22 significantly enhances the agglomeration of the constituents 18 in the fluid stream 16 which promotes the removal of the constituents 18 in their agglomerated form by conventional filtration or other methods. While implementation of the present invention may be described with respect to power plant and power generation facilities and agglomeration of combustion gas exhaust, for example, it should be appreciated, however, that the present invention is in no way limited to this application and it is anticipated and within the spirit and scope of the present invention that a modulated acoustic field 22 may be applied to fluid in an unlimited number of various applications for the purposes of agglomerating constituents 18.

For example, while the fluid stream 16 is illustrated as traveling in a duct 12, in the present illustration, it is within the spirit and scope of the present invention that the acoustic field be applied to a chamber enclosing and completely retaining the fluid stream 16 or in open air applications where there is no containment of the fluid stream 16. Also, the fluid stream 16 may be an outdoor environment wherein the constituents 18 that are to be desirably removed may be pollution, biohazardous materials or chemicals in the air or environment, such as those accidentally or intentionally placed into the atmosphere that are hazardous to individuals or the environment.

The acoustic field 22 may further be applied to large areas, such as, but not limited to, within buildings or facilities where constituents 18, such as foreign particles that are desirably removed from the air, may exist and for environmental and health reasons the constituents 18 must be removed. The acoustic agglomerator 10 may further have application in industrial situations where water, such as lakes and streams, have become polluted or contaminated and the pollutant or contaminant is desirably removed.

Other applications that would benefit from the present invention include manufacturing or other facilities where airborne particles require filtration for health, safety, and other reasons, such as within manufacturing facilities or otherwise. Additional applications include, for example, exhaust systems of conventional combustion engines used in the automotive industry to reduce dangerous and hazardous pollutants before being expelled into the atmosphere. Furthermore, while the fluid stream 16 may be illustrated as gas exhaust, in other aspects the fluid stream may be a gas or a liquid.

As previously discussed, applying a modulated acoustic field 22 promotes agglomeration since the smaller particles move in response to the acoustic wave more so than larger particles which result in more collisions of the larger and smaller particles. Once the collision occurs, electrostatic force promotes retention of the particles. Although sinusoidal waves produced by various sound sources may produce limited agglomeration, the present invention illustrates that dramatic agglomeration may be achieved by modulating the acoustic field 22. It will be appreciated, however, that the preferable frequency and amplitude of the acoustic field 22, as well as the modulation range, is heavily dependent upon the type of particulate matter, such as the constituents 18, that are desirably agglomerated.

Figure 2:
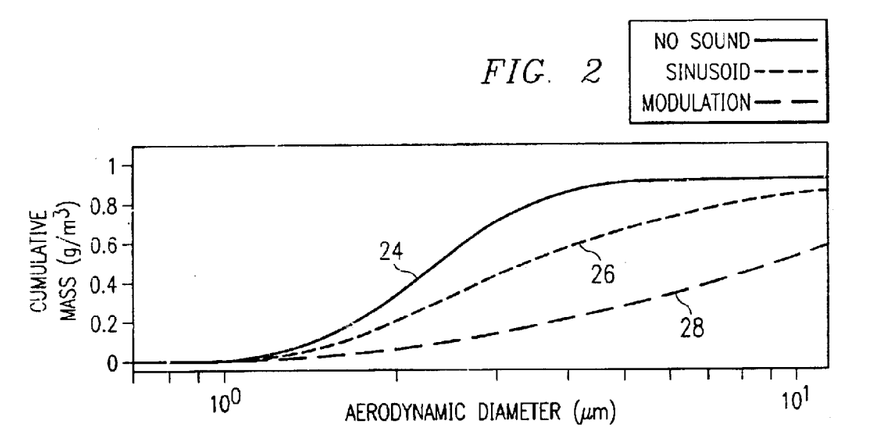
FIG. 2 is a graph illustrating the advantages, according to one aspect of the present invention, of acoustic modulation for acoustic agglomeration of lignite flyash.
Figure 3:
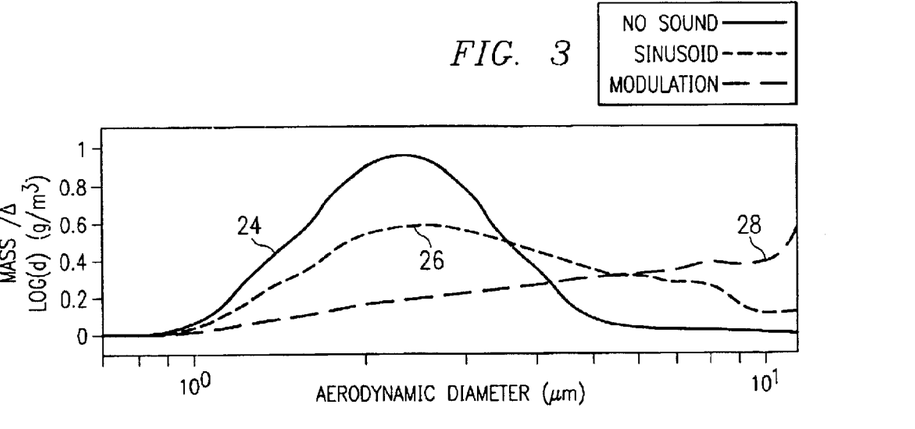
FIG. 3 is another graph illustrating the advantages, according to one aspect of the present invention, of acoustic modulation for acoustic agglomeration of lignite flyash.

FIG. 2 and FIG. 3 illustrate application of acoustic field 22 to promote agglomeration of lignite fly ash and the effects of applying a modulated acoustic field 22. The basis for these measurements include that the exhaust gas containing the fly ash was moving through the duct 12 at a rate of approximately 3 feet per second. The No Sound 24 measurement represents the particulate size of the combustion gas exiting from the boiler without the application of an acoustic field 22. The sinusoid 26 measurement includes application of a sinusoidal wave applied at approximately 600 Hz to the combustion gas exhaust and illustrates the resulting size of the particulate matter agglomeration. The modulation measurement 28 illustrates the effects of agglomeration by application of a modulated acoustic field 22 having a sound pressure level of approximately 150 dB referenced to 20 micro-Pascals at approximately 600 Hz modulated plus or minus 150 Hz. It will be appreciated, however, that the desired range of frequency and sound pressure level modulation should in no way be limited to the present example and many other ranges of modulation and settings of the frequency and sound pressure levels may be used according other aspects of the present invention.

It can be seen that application of a modulated acoustic field 22 to the fluid stream 16, such as the combustion gas exhaust containing constituents 18 of lignite fly ash, significantly enhances agglomeration and increases the mass of the particulate which promotes more effective and efficient removal by conventional filtration techniques as previously described. It can be seen that, for example, 0.5 to 2 micron particles in size may be effectively agglomerated to, for example, about 2 to 5 microns in size by application of a modulated acoustic field 22.

It will be appreciated that a bag house or ESP responds readily to this size and effectively eliminates particles in the 2 to 5 micron range. Although an ESP is effective at removing larger particulate matter, a significant amount of the smaller particulate are unaffected and causes emission and environmental problems, such as increased levels of opacity. In one aspect, application of the modulated acoustic field 22 may provide additional benefits, such as advantageously moving particles trapped in nodal positions. By changing the frequency the nodal position is shifted which further promotes agglomeration of the particulate matter.

Modulation of the acoustic field 22 may be accomplished by modulating the frequency of the acoustic field 22, or the amplitude of the acoustic field 22, or a combination of modulating both the frequency and the amplitude of the acoustic field 22. Depending upon the type of constituents 18 desirably removed from the fluid stream 16 a number of combinations of frequency and/or amplitude modulation may be desirably achieved to promote and optimize agglomeration. Although the above frequency and amplitude ranges may be desirable, according to one aspect for agglomerating lignite fly ash in a combustion gas exhaust stream, it will be appreciated that in other applications the range of frequency and amplitude may change significantly.

For example, the acoustic field 22, according to one aspect, may be frequency modulated in a range of up to 1

GHz and the amplitude of the acoustic field may be modulated in a range of up to 200 dB. In other aspects the frequency of the acoustic field 22 may be modulated in a range of up to 20 kHz and the amplitude of the acoustic field 22 may be modulated in a range of up to 200 dB. According to other aspects, the frequency of the acoustic field 22 may be preferably modulated in a range of from about 50 Hz to about 15 kHz and amplitude modulated in a range of from about 130 dB to about 175 dB.

The modulation of the acoustic field 22, according to one aspect, may preferably have an initial frequency such that the acoustic field 22 is thereafter frequency modulated relative to the initial frequency to a first frequency substantially less than the initial frequency while in other aspects the first frequency may be substantially greater than the initial frequency. According to other aspects, the frequency may be preferably modulated to a first frequency substantially greater than the initial frequency and thereafter modulated to a second frequency substantially less than the initial frequency, while in other aspects it may be preferable to modulate the acoustic field 22 to a first frequency substantially less than the initial frequency and thereafter to a frequency substantially greater than the initial frequency.

Figure 4:
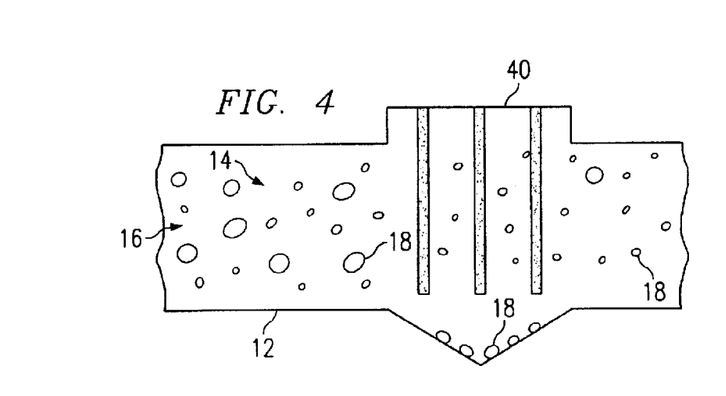
FIG. 4 is a side view of a duct communicating a combustion gas stream to a filtration device.

FIG. 4 illustrates a side view of a conventional exhaust duct 12 having an electrostatic precipitator (ESP) 40 disposed in the duct 12 such that the fluid stream 16 communicates through the passageway 14 to the ESP 40. The ESP 40, as previously discussed, is a well known conventional filtration system capable of removing constituents 18 of a certain size. However, the ESP 40 is ineffective for removing constituents 18 of smaller size, as illustrated.

Figure 5:
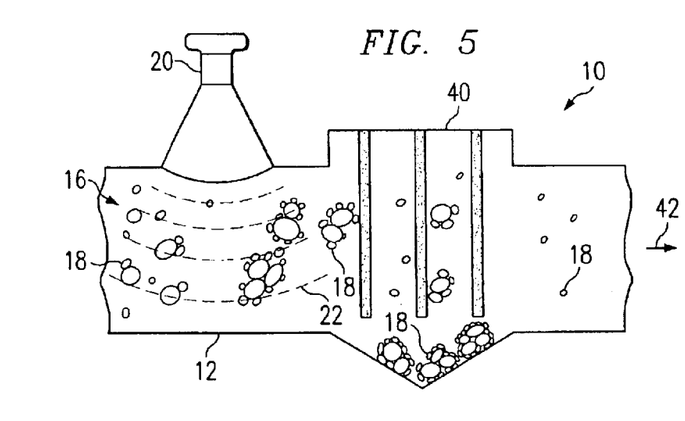
FIG. 5 is a side view of an acoustic agglomerator, according to yet another aspect of the present invention, provided with an acoustic generator and a filtration device for removal of particulates from a combustion gas stream.

FIG. 5 illustrates a perspective view of the acoustic agglomerator 10 utilized in a gas exhaust duct 12, substantially as illustrated in FIG. 4. In this aspect it can be seen that application of a modulated acoustic field promotes agglomeration of the constituents 18 which aids the ESP 40 in removing more of the constituents 18, such that only a fraction of the smaller constituents 18 are allowed to escape through this process.

Although the acoustic generator 20 is shown disposed substantially perpendicular to the direction 42 of the flow of the fluid stream 16, it should be appreciated that the acoustic generator 20 may be disposed longitudinally to the direction 42 of flow of the fluid stream 16 or, according to other aspects, at an angle arbitrary to the direction 42 of the flow of the fluid stream 16. It should also be appreciated that the frequency of the acoustic field may be modulated exponentially, linearly, non-linearly, or applied for a periodic interval, according to other aspects of the present invention, to preferably achieve acoustic agglomeration of constituents 18 to a predetermined size.

This presents another significant advantage of the present invention in that by modulating the acoustic field 22 according to different frequency and amplitude modulation ranges, the constituents may be agglomerated to a preferably size to optimize the removal of the constituents 18 in the fluid stream 16. This may be useful where the constituents 18, such as lignite fly ash, may be valuable for resale or reuse or otherwise but only where the lignite fly ash, for example, is of a predetermined size. The present invention is capable of applying a modulated acoustic field 22 to agglomerate particulate to a desired size.

Figure 6:
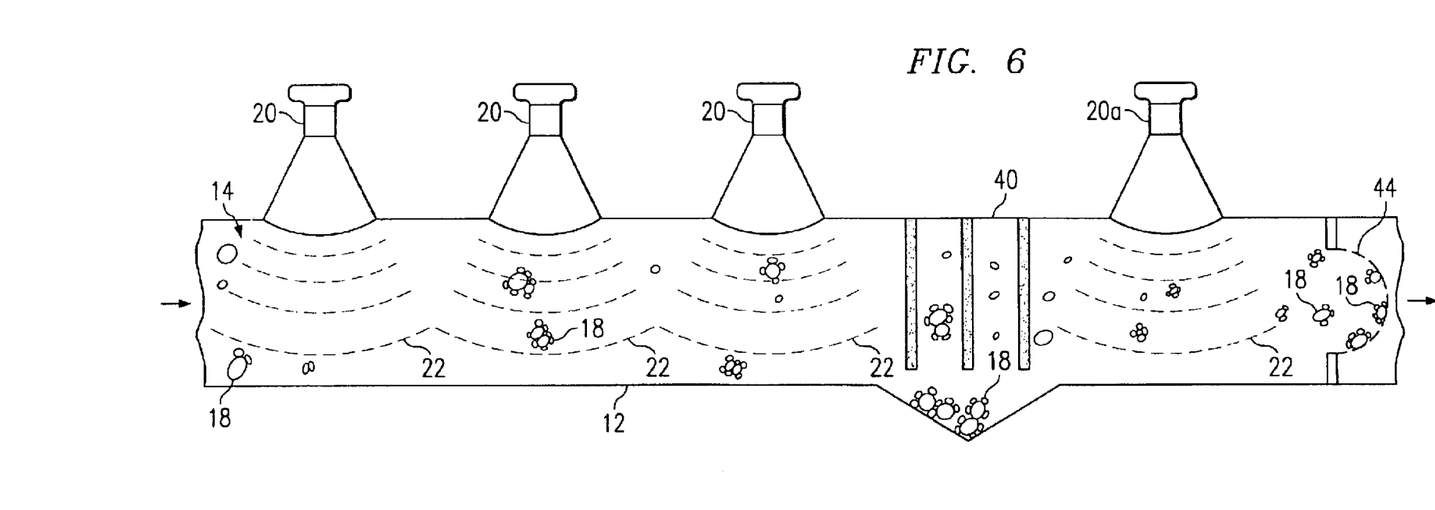
FIG. 6 is a side view of a one aspect of the present invention wherein the duct is provided with a plurality of acoustic generators for generating a modulated acoustic field.

FIG. 6 illustrates another aspect of the present invention of an acoustic agglomerator 10 including a plurality of acoustic generators 20 disposed along the duct 12 such that the acoustic generators 20 are operable to produce a modulated acoustic field 22 within the passageway 14 of the duct 12. It can be seen that, according to one aspect, it may be preferable to provide a plurality of acoustic generators to apply a plurality of acoustic fields 22 to optimize the agglomeration of the constituents 18 in the fluid stream 16.

In this aspect, the acoustic field 22 generated by each of the acoustic generators 22 may be modulated according to a predetermined frequency and/or amplitude for optimum agglomeration. The predetermined characteristics of the acoustic field 22, including the initial amplitude and frequency, as well as the modulation ranges, may, according to some aspects, include providing an acoustic field 22 produced by each of the acoustic generators that is substantially similar, while in other aspects the acoustic field 22 generated by each of the acoustic generators 20 may be different, while in yet other aspects some of the acoustic fields 22 may be similar while others may have different acoustic characteristics.

Furthermore, by positioning the acoustic generators 20 to optimize agglomeration prior to the fluid stream 26 entering the ESP 40, an optimum amount of agglomeration and resulting removal of constituents 18 may be achieved. According to other aspects, additional acoustic generators 20 such as the acoustic generator 20A may be provided downstream of the ESP 40 and prior to other filtration devices, such as a bag house 44.

The bag house 44 may include a filter operable for collecting constituents 18 of a specific size such that the filter may be emptied from time-to-time when the filter becomes full or ineffective because it is clogged. Another advantage of the present invention is that the agglomeration may achieve constituents 18 of a desired size, such as constituents 18 large enough not to become lodged within the filtration membrane, for example, utilized by the bag house 44.

Therefore, the bag house 44 may be optimally emptied of larger agglomerated constituents 18 as opposed to being discarded when the smaller constituents 18 become lodged in the membrane of the filtration portion of the bag house 44. Otherwise, the filtration portion of the bag house 44 is rendered ineffective and must be discarded. Thus, utilization of the present invention extends the life and reduces the costs of certain conventional filtration devices further reducing the costs and promoting the efficiency of, for example, conventional power plant filtration components.

Furthermore, application of acoustic agglomeration, according to one aspect of the present invention, upstream from the bag house can reduce the required frequency of cleaning because larger agglomerated particles tend to more slowly clog the filter material. This effect has been measured during various slip-stream tests at coal-fired power plants. This provides another advantage of the present invention, since it is well known that a reduction in cleaning frequency can improve bag lifetime because the cleaning process (compressed air and/or shaking) can be destructive.

Figure 7:
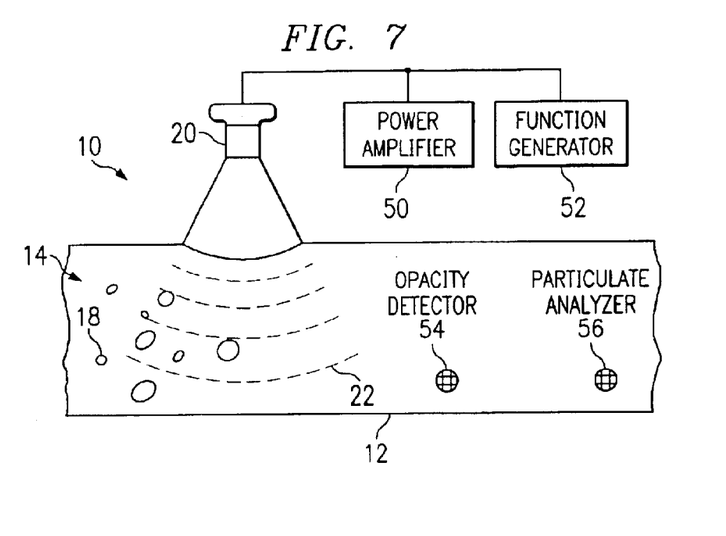
FIG. 7 is a side view of an acoustic agglomerator constructed in accordance with another aspect of the present invention.

FIG. 7 illustrates another aspect of the present invention wherein the acoustic agglomerator 10 is further provided with a power amplifier 50 in communication with the acoustic generator 20. The power amplifier is operable to amplify the power output of the acoustic generator 20. The acoustic agglomerator 10 further provided with a function generator 52, the function generator 52 is operable to generate frequency modulation of the acoustic field 22 produced by the acoustic generator 20. The acoustic agglomerator 10 is further provided with an opacity detector 54 in communication with the passageway 14 of the duct 12 and operable to detect the opacity of the fluid stream 16.

The acoustic agglomerator 10 is further provided with a particulate analyzer 56 operable to obtain information with respect to the constituents 18 such as, but not limited to, the size of the constituents 18. Utilizing the opacity detector 54 and the particulate analyzer 56, the acoustic agglomerator 10 may operably determine information about the fluid stream 16 and the constituents 18 contained in the fluid stream 16 and in response to, for example, undesirable opacity levels and/or particulate size of the constituents 18, the acoustic field 22 may be modified, such as the frequency and amplitude as well as the modulation, to optimize the agglomeration of the constituents 18.

Figure 8:
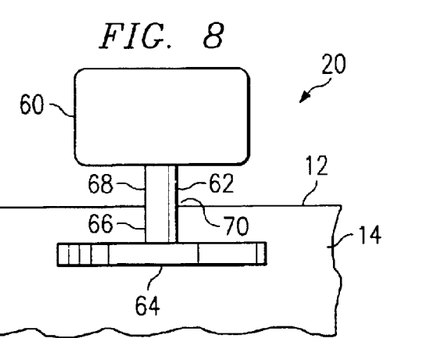
FIG. 8 is a side view of one aspect of the acoustic generator having a mechanical oscillator, a shaft and an acoustic plate.

FIG. 8 illustrates another aspect of the present invention of the agglomerator 20 constructed in accordance with one aspect of the present invention. The agglomerator 20 includes a mechanical oscillator 60, a shaft 62, and a plate 64. The plate 64 is configured for acoustic generation and may be constructed from a variety of materials such as metal or polymeric materials, for example. The shaft is provided with a first end 66 connected to the acoustic plate 64 and a second end 68 connected to the mechanical oscillator 60. The mechanical oscillator 60 is operable to impart a mechanical oscillation on the second end 68 of the shaft 62 and to the acoustic plate 64 connected to the shaft 62 to generate a modulated acoustic field 22.

The acoustic plate 64, according to this aspect, is disposed within the passageway 14 of the duct 12, as illustrated in partial cutaway in the present view. The shaft 62 projects through an opening 70 in the duct 12 such that the acoustic plate 64 may be oscillated to produce the modulated acoustic field 22 within the duct 12.

Figure 9:
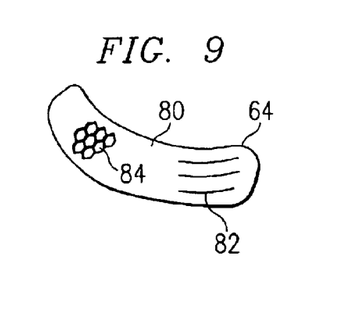
FIG. 9 is a perspective view of one aspect of the acoustic plate illustrated in FIG. 8.

FIG. 9 illustrates one aspect of the acoustic plate 64 shown in FIG. 8. In this view, it can be seen that the acoustic plate 64 may be configured in a variety of manners including substantially arcuate or flat. A first side 80 of the acoustic plate 64 is provided with a plurality of ribs 82. In other aspects, the acoustic plate 64 may be constructed in a substantially honeycomb configuration 84 throughout, although only a portion is illustrated in the present view.

Depending upon the different configurations of the acoustic plate 64, various frequencies and modulation ranges may be preferably achieved, such as when the acoustic plate 64 is oval versus substantially circular or rectangularly configured, which are all within the spirit and scope of the present invention. Although a variety of configurations of the acoustic plate 64 may be utilized and are within the scope of the present invention, no further description of acoustic plate 64 configurations will be described for purposes of brevity.

Figure 10:
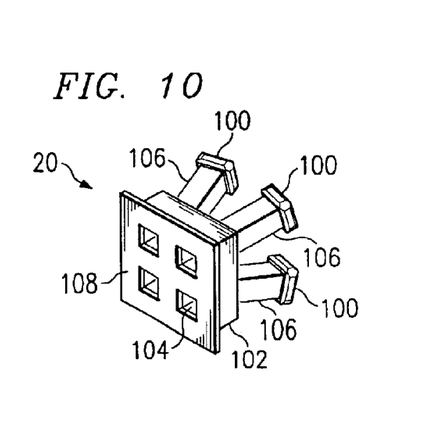
FIG. 10 is a perspective view of another aspect of the acoustic generator including a plurality of sound sources and a manifold.

FIG. 10 illustrates another aspect of the acoustic generator 20 constructed in accordance with the present invention. In this aspect the acoustic generator 20 is defined as an electrodynamic compression driver array provided with a plurality of sound sources 100, each operable for generating a modulated acoustic field 22. The acoustic generator 20 further includes a manifold 102 having a main chamber 104 and a plurality of chamber ports 106 in communication with the sound source 100 and the main chamber 104.

The manifold may be constructed from a plurality of materials such as metal, aluminum, cast-aluminum and serves as a thermal conductor and/or radiator that isolates the sound sources 100, such as compression drivers, from elevated temperatures. The end 108 of the manifold 102 is operably coupleable to the duct 12 in an airtight fashion and has provisions for pressure equalization between the front and back of the diaphragms (not shown) of the sound sources 100, such as the compression driver diaphragm. Another provision of the compression driver (described only briefly here) allows the sound sources 100 to be tuned electrically and mechanically to most efficiently generate sound within a 10% band of a specific center frequency. The center frequency may be adjusted through a manual or automatic tuning of individual sound sources 100 within the array.

It should be appreciated that either the acoustic generator 20 illustrated in FIG. 8 or 10 may be utilized with the acoustic agglomerator 10 of the present invention and that, in some aspects, a plurality of acoustic generators 20 configured as illustrated in FIGS. 8 and 10 may be utilized as well. Although the acoustic generator 20 illustrated in FIG. 10 may be shown with a plurality of sound sources 100 coupled to the manifold 102, it will be appreciated in other aspects that only a single sound source 100 is coupled to a single manifold 102 while in other aspects a greater number of sound sources 100 may be coupled to a manifold 102 configured to receive a plurality of sound sources 100.

Furthermore, the configuration of the manifold 102, as illustrated in FIG. 10, represents only one possible configuration in the manifold 102 and a variety of manifold 102 configurations may be utilized and are sufficient for the purposes of the present invention and are within the spirit and scope of the present invention. It should also be appreciated that although the acoustic generators 20 illustrated in FIGS. 8 and 10 may be preferably utilized, in some aspects, a variety of sound source 100 configurations may be utilized so long as a given sound source is operable to produce a modulated acoustic field 22.

Figure 11:
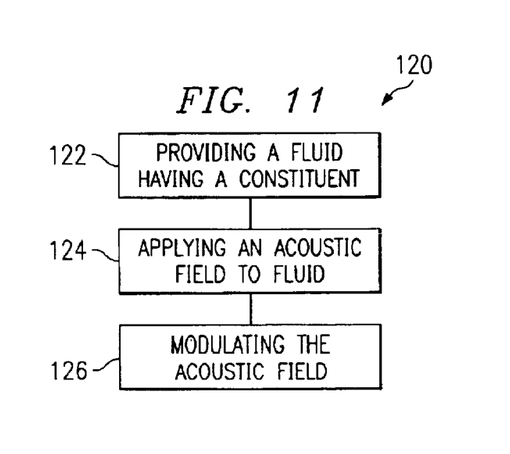
FIG. 11 is flow-chart illustrating one aspect of the present invention of a method for acoustic agglomeration by modulation of the acoustic field.

FIG. 11 illustrates one aspect of the present invention of a method 120 for agglomerating constituents 18 in a fluid, such as the fluid stream 16. At a first block 122 the method includes providing a fluid having constituents 18. In this block 122, as previously discussed, the fluid having constituents 18 may be in an open air environment, within a facility or building, or within an enclosed duct 12 or passageway 14. As previously discussed, the fluid stream 16 may include a gas or a liquid and the constituent 18 may be any type of material, whether liquid, gaseous or otherwise, provided in the fluid stream 16 that is desirably agglomerated for removal or other purposes.

At a block 124, the method includes applying an acoustic field 22 to the fluid stream 16. In this aspect the method may include, according to some aspects, including one or more acoustic generators 20 operable for generating a modulated acoustic field. At a block 126, the method provides for modulating the acoustic field 22.

As previously discussed, the acoustic field 22 may be amplitude modulated, frequency modulated or a combination of both frequency and amplitude modulated. Furthermore, in aspects where a plurality of acoustic generators 20 are utilized, a plurality of acoustic fields 22 each having varying characteristics of amplitude and frequency modulation may be employed. In aspects employing a plurality of acoustic generators 20, some of the acoustic generators 20 may produce acoustic fields 22 that may not necessarily be modulated.

Thus, it is apparent that there has been provided, in accordance with the present invention, an acoustic aggomeration apparatus and method that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various embodiments shown in the drawings herein illustrate that the present invention may be implemented and embodied in a variety of different ways that still fall within the scope of the present invention.

Also, the techniques, designs, elements, and methods described and illustrated in the preferred embodiment as discrete or separate may be combined or integrated with other techniques, designs, elements, or methods without departing from the scope of the present invention. Other examples of changes, substitutions, and alterations are readily ascertainable by one skilled in the art and could be made without departing from the spirit and scope of the present invention.

What is claimed is:

1. A method for agglomerating constituents in a fluid, comprising:
   providing a fluid with a constituent;
   applying an acoustic field to the fluid; and
   modulating the acoustic field to cause the constituent to agglomerate, wherein the fluid is provided in an open area and wherein the modulated acoustic field is applied to the open area to cause the constituent to agglomerate.

2. A method for agglomerating constituents in a fluid, comprising:
   providing a fluid with a constituent;
   applying an acoustic field to the fluid;
   modulating the acoustic field to cause the constituent to agglomerate, wherein the fluid is provided in a fluid passageway, the modulated acoustic field is applied to the fluid in the fluid passageway to cause the constituent to agglomerate, the fluid passageway is further defined as a duct having a sidewall defining a passageway adapted to communicate the fluid, and wherein the duct is further defined as an exhaust duct.

3. A method for agglomerating constituents in a fluid, comprising:
   providing a fluid with a constituent;
   applying an acoustic field to the fluid; and
   modulating the acoustic field to cause the constituent to agglomerate, wherein the acoustic field is frequency modulable.

4. The method of claim 3, wherein the acoustic field is further defined as amplitude modulable.

5. The method of claim 4, wherein the frequency of the acoustic field is modulable in a range of up to 1 GHz and wherein the amplitude of the acoustic field is modulable in a range of up to 200 dB referenced to 20 micro-Pascals.

6. The method of claim 4, wherein the frequency of the acoustic field is modulable in a range of up to 20 kHz and wherein the amplitude of the acoustic field is modulable in a range of up to 200 dB referenced to 20 micro-Pascals.

7. The method of the claim 4, wherein the frequency of the acoustic field is modulable in a range of from about 50 Hz to about 15 kHz and wherein the amplitude of the acoustic field is modulable in a range of from about 130 dB to about 175 dB referenced to 20 micro-Pascals.

8. A method for agglomerating constituents in a fluid, comprising:
   providing a fluid with a constituent;
   applying an acoustic field to the fluid; and
   modulating the acoustic field to cause the constituent to agglomerate, wherein the fluid is further defined as a gas.

9. A method for agglomerating constituents in a fluid, comprising:
   providing a fluid with a constituent;
   applying an acoustic field to the fluid; and
   modulating the acoustic field to cause the constituent to agglomerate, wherein the fluid is further defined as a combustion exhaust gas.

10. The method of claim 9 wherein the constituent of the combustion gas is further defined as fly ash.

11. A method for agglomerating constituents in a fluid, comprising:
    providing a fluid with a constituent;
    applying an acoustic field to the fluid; and
    frequency modulating the acoustic field to cause the constituent to agglomerate.

12. The method of claim 11, wherein the fluid is provided in an open area and wherein the frequency modulated acoustic field is applied to the open area to cause the constituent to agglomerate.

13. The method of claim 11, wherein the fluid is provided in a chamber and wherein the frequency modulated acoustic field is applied to the fluid in the chamber to cause the constituent to agglomerate.

14. The method of claim 11, wherein the fluid is provided in a fluid passageway and wherein the frequency modulated acoustic field is applied to the fluid in the fluid passageway to cause the constituent to agglomerate.

15. The method of claim 14, wherein the fluid passageway is further defined as a duct having a sidewall defining a passageway adapted to communicate the fluid.

16. The method of claim 15, wherein in the duct is further defined as an exhaust duct.

17. The method of claim 11, further comprising:
    applying a second acoustic field to the fluid; and
    frequency modulating the second acoustic field to cause the constituent to agglomerate.

18. The method of claim 11, further comprising:
    applying a plurality of acoustic fields to the fluid; and
    frequency modulating the plurality of acoustic fields to cause the constituent to agglomerate.

19. The method of claim 18, wherein the frequency modulation of each of the plurality of acoustic fields are substantially similar.

20. The method of claim 18, wherein the frequency modulation of each of the plurality of acoustic fields are substantially different.

21. The method of claim 11, wherein the acoustic field is further defined has having a frequency in a range of up to 1 GHz.

22. The method of claim 11, wherein the acoustic field is further defined has having a frequency in a range of up to 20 kHz.

23. The method of claim 11, wherein the acoustic field is further defined has having a frequency in a range of from about 50 Hz to about 15 kHz.

24. The method of claim 11, wherein the acoustic field has an initial frequency and wherein the acoustic field is frequency modulated relative to the initial frequency to cause the constituent to agglomerate.

25. The method of claim 24, wherein the acoustic field is modulated to a first frequency substantially less than the initial frequency.

26. The method of claim 24, wherein the acoustic field is modulated to a first frequency substantially greater than the initial frequency.

27. The method of claim 25, wherein the acoustic field is modulated to a second frequency substantially greater than the first frequency.

28. The method of claim 25, wherein the acoustic field is modulated to a second frequency substantially greater than the initial frequency.

29. The method of claim 26 wherein the acoustic field is modulated to a second frequency substantially less than the first frequency.

30. The method of claim 26, wherein the acoustic field is modulated to a second frequency substantially less than the initial frequency.

31. The method of claim 11, wherein the fluid is further defined as a liquid.

32. The method of claim 11, wherein the fluid is further defined as a gas.

33. The method of claim 11, wherein the fluid is further defined as a combustion exhaust gas.

34. The method of the claim 33 wherein the combustion gas particulate is further defined as fly ash.

35. A method for agglomerating constituents in a fluid, comprising:
    providing a fluid with a constituent;
    applying an acoustic field to the fluid; and
    amplitude modulating the acoustic field to cause the constituent to agglomerate, wherein the fluid is provided in an open area and wherein the amplitude modulated acoustic field is applied to the open area to cause the constituent to agglomerate.

36. A method for agglomerating constituents in a fluid, comprising:
    providing a fluid with a constituent;
    applying an acoustic field to the fluid; and
    amplitude modulating the acoustic field to cause the constituent to agglomerate, wherein the fluid is provided in a fluid passageway, the amplitude modulated acoustic field is applied to the fluid in the fluid passageway to cause the constituent to agglomerate, the fluid passageway is further defined as a duct having a sidewall defining a passageway adapted to communicate the fluid, and wherein the duct is further defined as an exhaust duct.

37. A method for agglomerating constituents in a fluid, comprising:
    providing a fluid with a constituent;
    applying an acoustic field to the fluid; and
    amplitude modulating the acoustic field to cause the constituent to agglomerate, wherein the fluid is further defined as a gas.

38. A method for agglomerating constituents in a fluid, comprising:
    providing a fluid with a constituent;
    applying an acoustic field to the fluid; and
    amplitude modulating the acoustic field to cause the constituent to agglomerate, wherein the fluid is further defined as a combustion exhaust gas.

39. The method of claim 38 wherein the combustion gas particulate is further defined as fly ash.

40. A method for agglomerating constituents in a fluid stream, comprising:
    providing the fluid stream containing a constituent into a fluid passageway adapted to communicate the fluid stream;
    applying an acoustic field to the fluid stream in the fluid passageway; and
    modulating the acoustic field in the fluid passageway to cause the constituent to agglomerate in the fluid stream, wherein the acoustic field is applied in a direction angularly arbitrary to a direction of flow of the fluid stream through the fluid passageway.

41. A method for agglomerating constituents in a fluid stream, comprising:
    providing the fluid stream containing a constituent into a fluid passageway adapted to communicate the fluid stream;
    applying an acoustic field to the fluid stream in the fluid passageway; and
    modulating the acoustic field in the fluid passageway to cause the constituent to agglomerate in the fluid stream, wherein the fluid stream is further defined as a gas.

42. A method for agglomerating constituents in a fluid stream, comprising:
    providing the fluid stream containing a constituent into a fluid passageway adapted to communicate the fluid stream;
    applying an acoustic field to the fluid stream in the fluid passageway; and
    modulating the acoustic field in the fluid passageway to cause the constituent to agglomerate in the fluid stream, wherein the fluid stream is further defined as exhaust gas.

43. The method of claim 42, wherein the constituent is further defined as fly ash.

44. A method for agglomerating constituents in a fluid stream, comprising:
    providing the fluid stream containing a constituent into a fluid passageway adapted to communicate the fluid stream;
    applying an acoustic field to the fluid stream in the fluid passageway; and
    modulating the acoustic field in the fluid passageway to cause the constituent to agglomerate in the fluid stream, wherein the acoustic field is frequency modulable and amplitude modulable.

45. The method of claim 44, wherein the acoustic field is exponentially modulated.

46. The method of claim 44, wherein the frequency of the acoustic field is modulated linearly.

47. The claim 44, wherein the frequency of the acoustic field is modulated non-linearly.

48. The method of claim 44, wherein the modulation of the acoustic field is applied for a periodic interval.

49. The method of claim 44, further comprising modulating the acoustic field to agglomerate constituents to a predetermined size.

50. The method of claim 44, further comprises:
    applying a second acoustic field to the fluid; and
    amplitude modulating the second acoustic field to cause the constituent to agglomerate.

51. The method of claim 44, further comprising:
    applying a plurality of acoustic fields to the fluid; and
    amplitude modulating the acoustic field to cause the constituent to agglomerate.

52. An acoustic agglomerator for agglomerating constituents in a fluid, the acoustic agglomerator comprising:
    an acoustic plate configured for acoustic generation;
    a shaft having a first end and a second end, the first end of the shaft connected to the acoustic plate; and
    a mechanical oscillator connected to the second end of the shaft for imparting an oscillation thereon the shaft and the acoustic plate connected thereto for generating a modulated acoustic field, wherein the fluid is provided in an open area and wherein the modulated acoustic field is applied to the open area to cause the constituent to agglomerate.

53. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the fluid is further defined as a liquid.

54. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as a substantially rectangular plate.

55. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as a substantially oval plate.

56. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as a substantially arcuate plate.

57. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as having a plurality of ribs on a surface thereof.

58. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as substantially honeycomb.

59. An acoustic agglomerator for agglomerating constituents in a fluid, the acoustic agglomerator comprising:
an acoustic plate configured for acoustic generation;
a shaft having a first end and a second end, the first end of the shaft connected to the acoustic plate; and
a mechanical oscillator connected to the second end of the shaft for imparting an oscillation thereon the shaft and the acoustic plate connected thereto for generating a modulated acoustic field, wherein the acoustic plate is further defined as having a honeycomb portion.

60. An acoustic agglomerator for agglomerating constituents in a fluid stream, the acoustic agglomerator comprising:
a duct having a sidewall defining a fluid passageway, the duct adapted to receive the fluid stream having the constituents;
a manifold system coupled to the duct such that the manifold system communicates with the fluid passageway; and
at least a first sound source coupled to the manifold system and operable to generate a modulated acoustic field within the fluid passageway of the duct.

61. The acoustic agglomerator of claim 60, wherein the at least first sound source is further defined as an electrodynamic compression driver.

62. The acoustic agglomerator of claim 60, wherein the at least first sound source is further defined as operable to generate a sound pressure level of at least 150 dB referenced to 20 micro-Pascals at a range of 2 meters.

63. The acoustic agglomerator of claim 60, wherein the manifold system further includes a main chamber in communication with the fluid passageway of the duct and at least a first channel in communication with the main chamber.

64. The acoustic agglomerator of claim 63, wherein the manifold system is further defined as having a plurality of channels in communication with the main chamber.

65. The acoustic agglomerator of claim 64, further provided with a plurality of sound sources each coupled to one of the plurality of channels in communication with the main chamber.

66. The acoustic agglomerator of claim 65, wherein the manifold system including the plurality of channels in communication with the main chamber and the plurality of sound sources each coupled to one of the plurality of channels defines a compression driver array and wherein a plurality of compression driver arrays are operably coupled to generate a modulated acoustic field within the fluid passageway of the duct.

67. The acoustic agglomerator of claim 60, wherein the acoustic field is frequency modulable.

68. The acoustic agglomerator of claim 67, wherein the acoustic field is further defined as amplitude modulable.

69. The acoustic agglomerator of claim 60, wherein the acoustic field is amplitude modulable.

70. The acoustic agglomerator of claim 60, wherein the frequency of the acoustic field is modulable in a range of up to 1 GHz and wherein the amplitude of the acoustic field is modulable in a range of up to 200 dB referenced to 20 micro-Pascals.

71. The acoustic agglomerator of claim 60, wherein the frequency of the acoustic field is modulable in a range of up to 20 kHz and wherein the amplitude of the acoustic field is modulable in a range of up to 200 dB referenced to 20 micro-Pascals.

72. The acoustic agglomerator of claim 60, wherein the frequency of the acoustic field is modulable in a range of from about 50 Hz to about 15 kHz and wherein the amplitude of the acoustic field is modulable in a range of from about 130 dB to about 175 dB referenced to 20 micro-Pascals.

73. An acoustic agglomerator for removing particulates from a fluid stream, comprising:
   a duct having a sidewall defining a passageway, the duct operable to receive the fluid stream having particulates;
   an acoustic generator adapted to generate a modulated acoustic field in the fluid passageway of the duct, wherein the acoustic generator further comprises:
      a manifold system coupled to the duct such that the manifold system communicates with the fluid passageway; and
      at least a first sound source coupled to the manifold system and operable to generate a modulated acoustic field within the fluid passageway of the duct, and
      a regulation device in communication with the at least first sound source, the regulation device adapted to communicate a signal to the at least first sound source responsive to which the at least first sound source generates the modulated acoustic field; and
   a particle collection device in communication with the duct to receive the fluid stream therefrom the duct, the particle collection device adapted to remove at least a portion of the particulate from the fluid stream.

74. An acoustic agglomerator for removing particulates from a fluid stream, comprising:
   a duct having a sidewall defining a passageway, the duct operable to receive the fluid stream having particulates;
   an acoustic generator adapted to generate a modulated acoustic field in the fluid passageway of the duct; and
   a particle collection device in communication with the duct to receive the fluid stream therefrom the duct, the particle collection device adapted to remove at least a portion of the particulate from the fluid stream, wherein the acoustic field is defined as a sinusoidal wave.

75. A method for extending the useful life of filtration devices, comprising:
   providing an duct;
   providing a gas stream with a constituent in the duct;
   providing an acoustic generator operative to communicate an acoustic field in the duct;
   providing a filtration device in the duct downstream relative to the acoustic field generated in the duct;
   applying a modulated acoustic field to the gas stream in the duct upstream of the filtration device to promote agglomeration of the constituents in the gas stream;
   collecting by the filtration device at least some of the agglomerated constituents in the gas stream; and
   removing at least some of the agglomerated constituents from the filtration device to clean the filtration device.

76. The method of claim 75, wherein the duct is further defined as an exhaust duct and wherein the gas stream is further defined as a gas exhaust stream.

77. The method of claim 75, further comprising:
   determining an acoustic attribute of the acoustic field to achieve agglomerated constituents sized to promote removal of the agglomerated constituents from the filtration device and wherein the modulated acoustic field applied to the gas stream in the duct is further defined as having the determined acoustic attribute.

78. The method of 77, wherein the acoustic attribute is a frequency modulation of the acoustic field.

79. The method of claim 77, wherein the acoustic attribute is an amplitude modulation of the acoustic field.

80. The method of claim 75, further comprising:
   determining an acoustic attribute of the acoustic field to achieve agglomerated constituents sized to inhibit clogging of the agglomerated constituents in a membrane of the filtration device and wherein the modulated acoustic field applied to the gas stream in the duct is further defined as having the determined acoustic attribute
   to inhibit clogging of the agglomerated constituents in the membrane of the filtration device.

81. The method of claim 80, wherein the acoustic attribute is a frequency modulation of the acoustic field.

82. The method of claim 80, wherein the acoustic attribute is an amplitude modulation of the acoustic field.

83. The method of claim 75, wherein the acoustic field is further defined as frequency modulated.

84. The method of claim 75, wherein the acoustic field is further defined as amplitude modulated.

85. The method of claim 75, wherein the acoustic field is further defined as both frequency and amplitude modulated.

86. The method of claim 75, wherein the gas stream is further defined as a gas exhaust stream and wherein the constituent is further defined as fly ash.

87. The method of claim 75, wherein the filtration device is further defined as a fabric filter employed by a bag house in an exhaust duct of a power plant.

88. A method of agglomerating constituents in a gas stream to a desired size, the method comprising:
   providing an duct;
   providing a gas stream with a constituent in the duct;
   providing an acoustic generator operative to communicate an acoustic field in the duct;
   providing a filtration device in the duct downstream relative to the acoustic field generated in the duct;
   determining a desirable agglomerated size of the constituent;
   applying a modulated acoustic field to the gas stream in the duct upstream of the filtration device to achieve agglomeration of at least some of the constituents in the gas stream to the desirable agglomerated size;
   collecting by the filtration device at least some of the agglomerated constituents in the gas stream; and
   removing at least some of the agglomerated constituents from the filtration device to clean the filtration device.

89. The method of claim 88, wherein the acoustic field is further defined as frequency modulated.

90. The method of claim 88, wherein the acoustic field is further defined as amplitude modulated.

91. The method of claim 88, wherein the acoustic field is further defined as both frequency and amplitude modulated.

92. The method of claim 88, wherein the gas stream is further defined as a gas exhaust stream and wherein the duct is further defined as a gas exhaust duct in a power plant and wherein the constituent is further defined as fly ash.

* * * * *

UNITED STATES PATENT AND TRADEMARK OFFICE
CERTIFICATE OF CORRECTION

PATENT NO. : 6,749,666 B2
DATED : June 15, 2004
INVENTOR(S) : Meegan, Jr.

It is certified that error appears in the above-identified patent and that said Letters Patent is hereby corrected as shown below:

Title page,
Item [54], Title, delete "AGGIOMERATION" and insert -- AGGLOMERATION --.

Column 12,
Lines 50, 53 and 56, delete "has" and insert -- as --.

Column 14,
Line 45, after "The" insert -- method of --.
Line 52, delete the entire text of the claim and insert -- The method of claim 44, wherein the frequency modulation of the acoustic field is further defined as increasing the frequency of the acoustic field. --.
Line 56, delete the entire text of the claim and insert -- The method of claim 44, wherein the frequency modulation of the acoustic field is further defined as decreasing the frequency of the acoustic field. --.

Signed and Sealed this

Thirtieth Day of August, 2005

JON W. DUDAS
*Director of the United States Patent and Trademark Office*